United States Patent
Kessel

(10) Patent No.: US 9,774,484 B2
(45) Date of Patent: Sep. 26, 2017

(54) RECEIVER CONTROLLER

(71) Applicant: NXP B.V.

(72) Inventor: Martin Kessel, Dresden (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/239,505

(22) Filed: Aug. 17, 2016

(65) Prior Publication Data

US 2017/0078131 A1    Mar. 16, 2017

(30) Foreign Application Priority Data

Sep. 15, 2015   (EP) ..................................... 15185342

(51) Int. Cl.
    *H04L 27/26*       (2006.01)
    *H04L 25/03*       (2006.01)

(52) U.S. Cl.
    CPC .... *H04L 27/2649* (2013.01); *H04L 25/03006* (2013.01); *H04L 25/03019* (2013.01); *H04L 27/2607* (2013.01); *H04L 27/2663* (2013.01); *H04L 27/2665* (2013.01); *H04L 27/2666* (2013.01); *H04L 27/2678* (2013.01); *H04L 2025/03598* (2013.01)

(58) Field of Classification Search
    CPC ......................... H04L 27/2649; H04L 27/2607
    See application file for complete search history.

(56) References Cited

U.S. PATENT DOCUMENTS

| 2002/0057750 | A1* | 5/2002 | Nakao ................. H04L 27/2647 375/345 |
| 2003/0090994 | A1* | 5/2003 | Kakura ............... H04L 27/2605 370/208 |
| 2010/0118849 | A1* | 5/2010 | Kimura ............... H04L 27/2691 370/338 |
| 2011/0200089 | A1* | 8/2011 | Umeda ................ H04B 7/0854 375/232 |
| 2014/0335806 | A1 | 11/2014 | Kessel |
| 2015/0092767 | A1 | 4/2015 | Kessel |

OTHER PUBLICATIONS

Nogami, H. et al. "A transmission Mode Detector for OFDM Systems", Electronics & Communications in Japan, Part 1, vol. 86, No. 3, 79-94 pgs. (2003).
Extended European Search Report for Patent Appln. No. 15185342.1 (dated Mar. 10, 2016).

* cited by examiner

*Primary Examiner* — Jaison Joseph
(74) *Attorney, Agent, or Firm* — Rajeev Madnawat

(57) ABSTRACT

A receiver controller configured to control a receiver in receipt a signal comprising a series of time-consecutive symbols is disclosed. Each symbol includes an FFT window and a guard interval and the guard interval includes a cyclic prefix or postfix. The receiver controller is configured to control the receiver to acquire at least one signal parameter. The receiver controller is also configured to, based on a plurality of samples of the received signal, each sample having a predetermined sample length, determination of a plurality of correlation values based on pairs of the plurality of samples, said pairs of samples separated in time by a predetermined separation number of samples.

15 Claims, 4 Drawing Sheets

RECEIVER CONTROLLER

CROSS-REFERENCE TO RELATED APPLICATIONS

This application claims the priority under 35 U.S.C. §119 of European Patent application no. 15185342.1, filed on Sep. 15, 2015, the contents of which are incorporated by reference herein.

The present disclosure relates to a receiver controller for a receiver of signals having a cyclic prefix or postfix, such as an OFDM signal. In particular, it relates to a receiver controller configured to acquire a signal by determining a service data (e.g. FFT) window size, a guard interval size and/or the timing of the signal in order to receive a service encoded in said signal. The disclosure also relates to a receiver, an electronic device containing the receiver and a method of acquiring at least one signal parameter from a signal. The disclosure still further relates to a computer program or computer program product for performing the method.

According to a first aspect of the present disclosure there is provided a receiver controller configured to control a receiver in receipt a signal comprising a series of time-consecutive symbols, each symbol comprising a service data window and a guard interval, said guard interval comprising a cyclic prefix or postfix, the receiver controller configured to control the receiver to acquire at least one signal parameter, the receiver controller configured to;

based on a plurality of samples of the received signal, each sample having a predetermined sample length, provide for determination of a plurality of correlation values based on pairs of the plurality of samples, said pair of samples separated in time by a predetermined separation number of samples;

provide for determination of a first correlation block comprising a plurality of consecutive correlation values, the number of correlation values within the first correlation block based on a predetermined correlation block size, provide for determination of a second correlation block comprising a plurality of consecutive correlation values, the number of correlation values within the second correlation block based on the predetermined correlation block size, wherein the temporal separation between the first and the second correlation blocks is based on the predetermined correlation block size, provide for determination, using an average of at least the first correlation block and the second correlation block, an average correlation block; and if one or more average correlation values above a predetermined threshold are present in the average correlation block, acquire the at least one signal parameter of the signal, from the average correlation block, comprising the length of the guard interval and/or the length of the service data window and/or the timing of the symbols that form the signal.

In one or more embodiments, the predetermined threshold may comprise one or more of; an absolute threshold; a relative threshold relative to other average correlation values in the average correlation block; based on measurements of the signal such as a maximum peak size or an estimate of noise in the signal.

In one or more embodiments the signal may be an OFDM signal.

While first and second correlation blocks are used to form the average, in one or more embodiments at least three, four, five, six, ten, twenty or more correlation blocks may be averaged to form the average correlation block.

In one or more embodiments the receiver controller is configured to provide for determination of timing of the symbols that form the signal by at least one of;

a linear interpolation based on a ratio between one of the correlation values that exceeds the predetermined threshold and an adjacent correlation value that does not exceed the threshold and interpolated from a point in time associated with said correlation values that exceeds the predetermined threshold;

an inter-symbol-interference minimized service data window positioning algorithm;

a maximum usage algorithm;

a centre of gravity calculation;

based on the temporal position of the one or more average correlation values above the predetermined threshold.

In one or more embodiments the receiver controller is configured to determine an average correlation block for a plurality of candidate combinations of;

the predetermined separation number of samples; and the predetermined correlation block size;

to identify the average correlation block that includes one or more average correlation values above a predetermined threshold present in order to acquire the signal parameters of the signal therefrom.

In one or more embodiments, a plurality of candidate average correlation blocks are determined based on the candidate combinations, and the receiver controller is configured to determine which of the candidate average correlation blocks includes the one or more correlation values (and/or greatest number of average correlation values) above the predetermined threshold, the predetermined threshold comprising a relative threshold based on the candidate average correlation blocks.

In one or more embodiments the samples are each based on a predetermined number of measurements of baseband samples of the signal, which defines the predetermined sample length, the measurements of the baseband samples comprising in-phase (I) and quadrature (Q) elements, and the correlation value between pairs of samples comprises a sum of complex conjugate multiplied pairs of the baseband samples, the pairs separated by a predetermined number of baseband samples corresponding to the predetermined separation number of samples.

Thus the correlation between the samples may be based on a sum of a plurality of correlations between pairs of baseband samples.

In one or more embodiments the predetermined correlation block size is selected based on the product of the sample length and the number of correlation values within one of the correlation blocks being equal or substantially equal to a candidate symbol length of the signal in terms of the number of baseband samples that form said symbol length.

In one or more embodiments the temporal separation between the first and the second correlation blocks comprises the predetermined correlation block size or a function of the predetermined correlation block size. Such a function may be advantageous to compensate for factorisation issues between possible symbol lengths and component sample lengths and component number of samples in a block, as will be discussed further below.

Thus, if a correlation is determined in the average correlation block, the size of the average correlation block in terms of the number of baseband samples may be indicative of the symbol length. However, given that the size of the average correlation block is based on the number of pairs of samples used multiplied by the number of baseband samples pairs that are summed to form each correlation value, average correlation blocks having the requisite correlation values above a threshold may still be determined even when the size of the average correlation block is not exactly equal to the symbol length. In fact, it may not be possible to conveniently factorise a possible symbol length to obtain a convenient number of correlation values to form a correlation block. In such a situation, a correlation block size within a predetermined tolerance of a candidate symbol length may be selected and the temporal separation between the first and second correlation block may be set to the candidate symbol length.

In one or more embodiments the predetermined separation number of samples is based on a candidate service data window size.

In one or more embodiments, if the signal includes a null-signal comprising a period of time in which no energy is transmitted and which is indicative of the start of a logical group of symbols, the receive controller is configured to;
   once an average correlation block is identified that includes correlation value(s) above the predetermined threshold, identify a null correlation block amongst a plurality of correlation blocks by identifying at the correlation blocks with correlation values below a null threshold, the plurality of correlation blocks determined using the same predetermined separation number of samples and the predetermined correlation block size used to identify the aforesaid average correlation block that includes correlation value(s) above the predetermined threshold.

Thus, the determined service data window size and guard interval length may be used to obtain several correlation blocks in order to look for the presence of the null symbol.

In one or more embodiments the receiver controller is configured to acquire the signal parameters by way of one or more of the following;
   determine the length of the guard interval based on the number of consecutive correlation values above the predetermined threshold present in the average correlation block;
   determine the service data window size based on the predetermined separation number of samples used when the one or more correlation values above the predetermined threshold are present in the average correlation block;
   determine the timing of the start of a symbol based on the temporal position of the one or more correlation values above the predetermined threshold that are present in the average correlation block.

The start of the guard interval may not be exactly aligned (in terms of the baseband samples for example) with the samples used to form the correlation values. As the number of correlated pairs of baseband samples present in a sample increases, the greater the correlation value may be. Thus, once a contiguous group of one or more correlation values above a threshold are identified, which is believed to show the cyclic prefix/postfix, the ratio between correlation values at the edge of the group with an adjacent correlation values outside the group, may assist in determining at what baseband sample within the samples the cyclic prefix/postfix starts. Accordingly, the length of the guard interval may be determined from the number of correlation values above the threshold or by employing other techniques, discussed above in relation to the timing of the signals, to identify temporally where within the correlation values the guard interval may start and end.

In other examples, the guard interval length may be determined by determining the periodicity of the above-threshold average correlation values to identify a start and end time for the guard interval. In other examples, the symbol length may be determined by identifying the periodicity of the start or end of the above-threshold average correlation values over a plurality of average correlation blocks.

In one or more embodiments the receiver controller is configured to, following determination of the signal parameters, determine further average correlation blocks using the predetermined separation number of samples and said correlation block size corresponding to the determined signal parameters, to track the service data window position either continuously or intermittently during receipt of a service encoded into the signal by the receiver. Thus, the correlation blocks and/or average correlation blocks may be used for time tracking of the symbol timing.

In one or more embodiments the correlation values are complex values and the receiver controller is configured to determine a fine frequency offset parameter of the signal from an angle component of the complex values present in the average correlation block.

In one or more embodiments the receiver controller is configured to provide for processing of a first signal from a first antenna and a second signal from a different second antenna, and provide for combination of the signals or data derived from the signals, wherein the combination is based on at least one of;
   samples of the first signal and the second signal combined prior to determination of the correlation values;
   samples of the first signal used to determine a first set of correlation values and samples of the second signal used to determine a second set of correlation values, the first and second sets of correlation values combined prior to determination of the average correlation block;
   samples of the first signal used to determine a first average correlation block and samples of the second signal used to determine a second average correlation block, the first and second average correlation blocks combined prior to determination of the signal parameters from a resultant combined average correlation block.

In one or more embodiments the combination is weighted based on a measure of a relative signal quality associated with the signal from each antenna and/or the signals from the first and second antenna are phase corrected.

According to a second aspect of the present disclosure there is provided a receiver including an antenna for receiving a signal comprising a series of time-consecutive symbols, each symbol comprising a service data window and a guard interval, said guard interval comprising a cyclic prefix or postfix, the receiver including the receiver controller of the first aspect to acquire the signal parameters for receipt of a service contained in the signal.

According to a third aspect of the present disclosure there is provided a method of acquiring at least one signal parameter from a signal comprising a series of time-consecutive symbols, each symbol comprising a service data window and a guard interval, said guard interval comprising a cyclic prefix or postfix, the method comprising;
   based on a plurality of samples of the received signal, each sample having a predetermined sample length, provide for determination of a plurality of correlation values based on pairs of the plurality of samples, said pairs of samples separated in time by a predetermined separation number of samples;

providing for determination of a first correlation block comprising a plurality of consecutive correlation values, the number of correlation values within the first correlation block based on a predetermined correlation block size, providing for determination of a second correlation block comprising a plurality of consecutive correlation values, the number of correlation values within the second correlation block based on the predetermined correlation block size, wherein the temporal separation between the first and the second correlation blocks is based on the predetermined correlation block size, providing for determination, using an average of at least the first correlation block and the second correlation block, an average correlation block; and if one or more average correlation values above a predetermined threshold are present in the average correlation block, acquiring the at least one signal parameter of the signal, from the average correlation block, comprising the length of the guard interval and/or the length of the service data window and/or the timing of the symbols that form the signal.

According to a fourth aspect of the present disclosure there is provided an electronic device including the receiver of the second aspect.

According to a fifth aspect of the present disclosure there is provided a computer program or computer program product configured to, when loaded into memory and executed on a processor, performs the method of the third aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The Figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Orthogonal frequency division multiplexing (OFDM) is a method of encoding digital data on multiple orthogonal carrier frequencies. It is a popular encoding method and is used in, for example, the broadcast of signals (Digital Audio Broadcasting (DAB) radio and Digital Video Broadcasting (DVB-T), for example) and for networking (Wireless LAN, ADSL broadband and 4G cellular communications). Receivers of an OFDM signal (broadcast or cellular) need to synchronize to the signals, which is termed "signal acquisition". Signal acquisition may include identifying the transmission "mode" of the OFDM signal and may include temporally synchronising with the symbols that form the OFDM signal. The mode of an OFDM signal symbol may be expressed in terms of the length (in seconds or base band samples) of its service data content portion (i.e. service data representative of the service supplied) and the length (in seconds or base band samples) of a guard interval portion. The guard interval portions separate successive service data portions. As will be known to those skilled in the art, the service data windows, in OFDM, are commonly known as FFT windows, due to the use of Fourier Transforms in the transmission of such OFDM signals. The guard interval portions commonly include a copy of a subset of the data that makes up the FFT window. Thus, as will be known to those skilled in the art, in such a circumstance, the guard interval is referred to as a cyclic prefix or cyclic postfix depending whether the guard interval is applied before or after the FFT window.

Figure 2:
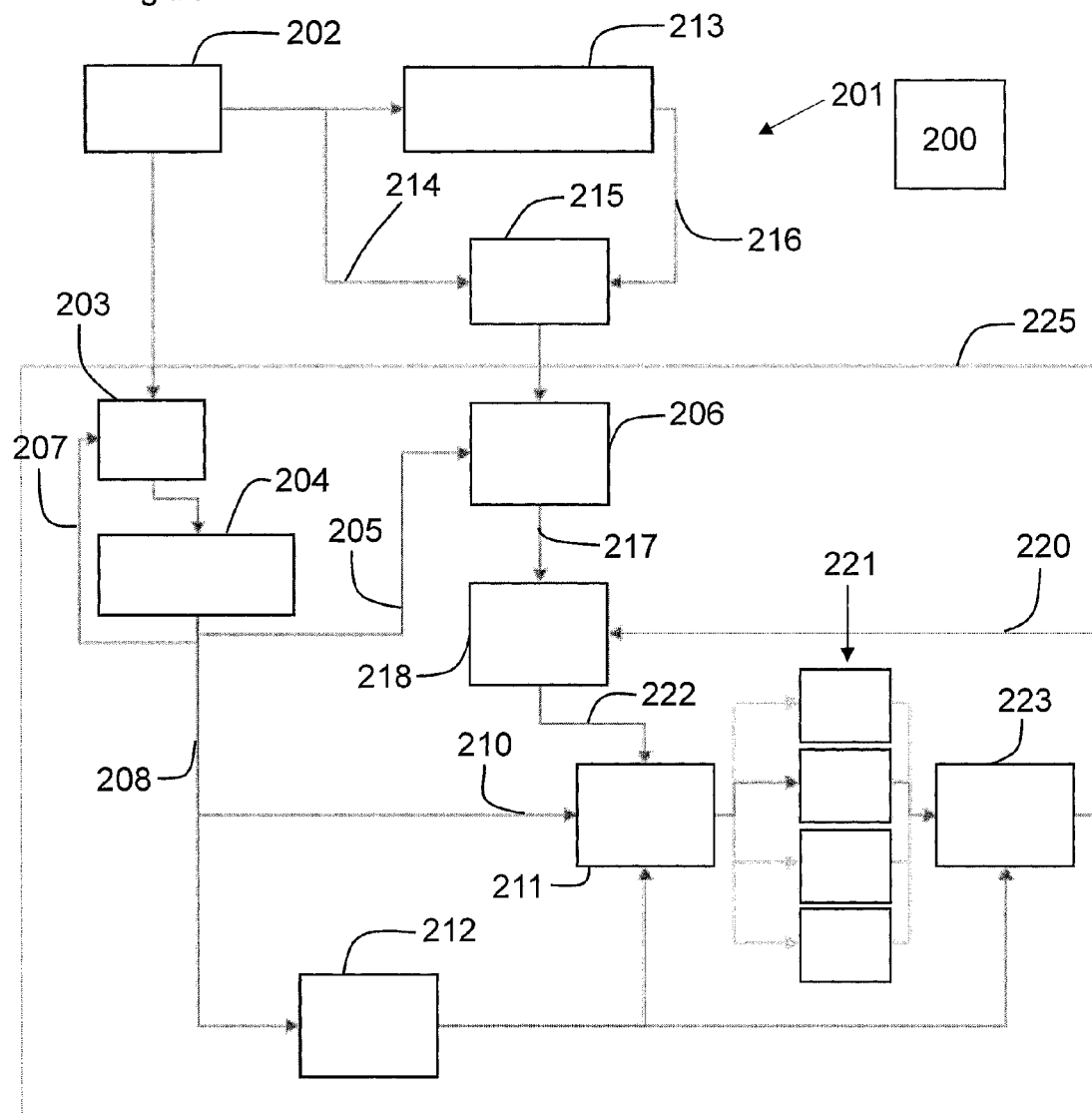
FIG. 2 shows an example functional diagram showing the functional structure of a receiver under the control of the example receiver controller.

It is common to have different OFDM transmission modes and a receiver is required to detect the mode as well as the timing of the symbols in order to "acquire" the signal and then provide the service or content encoded in said signal to a user or another apparatus. The receiver controller 200 of FIG. 2 is configured to at least provide for OFDM signal acquisition.

While the examples discussed herein are configured to receive an OFDM signal, it will be appreciated that the receiver controller and method have wider application to other types of received signal that use a cyclic postfix or cyclic prefix, such as LTE uplink or perhaps future (for example 5G) cellular communication standards.

Figure 1:
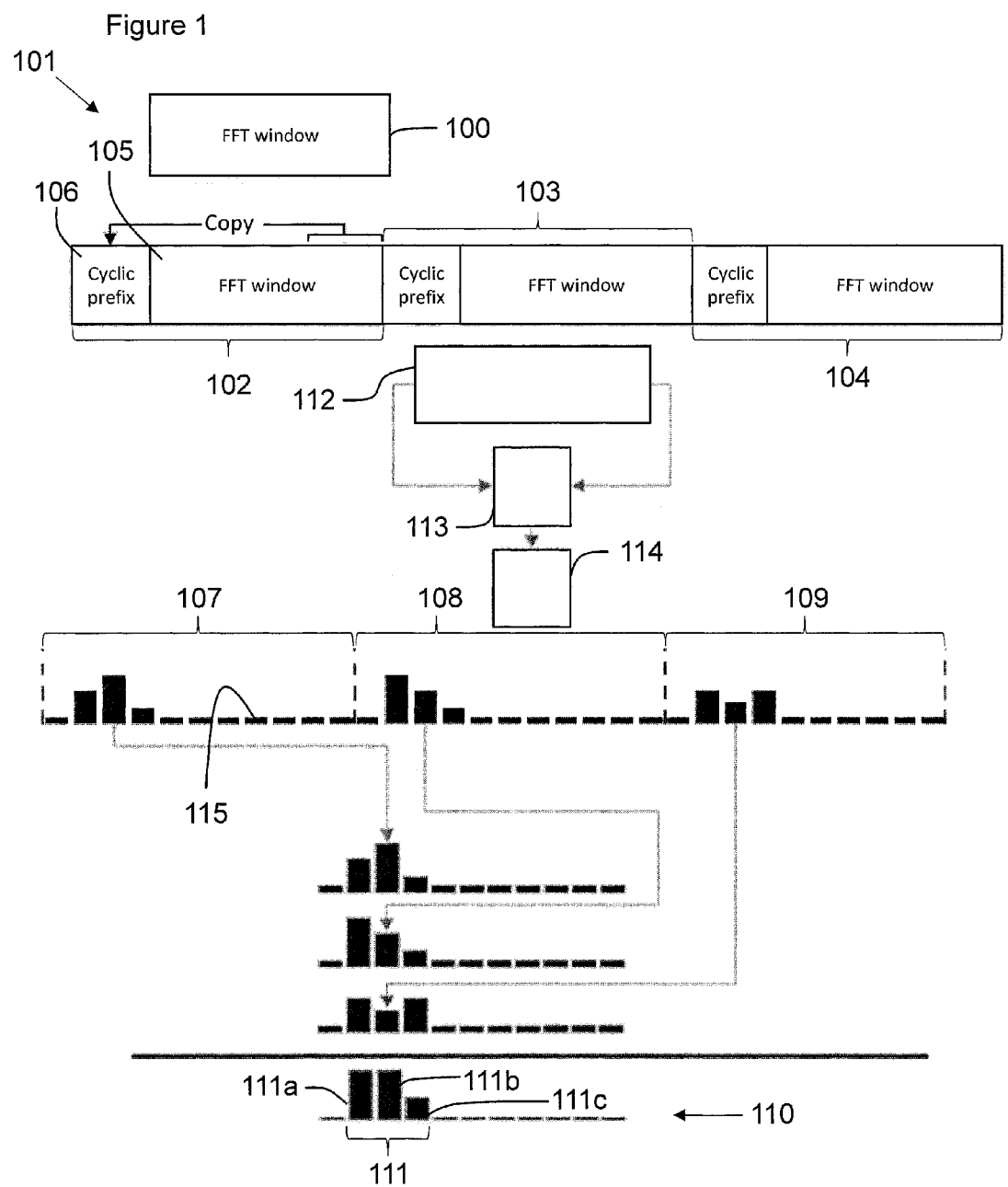
FIG. 1 shows an example summary of the process controlled by an example receiver controller.

Turning first to FIG. 1, a FFT window 100 is shown diagrammatically next to an OFDM signal 101 comprising three OFDM symbols 102, 103, 104. Each OFDM symbol 102, 103, 104 comprises a FFT window 105 and, in this example, a cyclic prefix 106. It is shown that the cyclic prefix comprises a copy of a subset of the data from the end of the FFT window 105. Thus, each symbol 102, 103, 104 begins with a portion of the data from the end of the FFT window (the cyclic prefix 106) followed by the full FFT window 105.

The receiver controller 200 is configured to provide for correlation between time delayed parts of the OFDM signal and assemble the correlation values into correlation blocks comprising a plurality of consecutive and discrete correlation values of the OFDM signal. Thus, a first functional element 112 represents obtaining a plurality of samples comprising the in-phase (I) and quadrature (Q) elements of an OFDM signal. In other examples, a plurality of samples of a real (intermediate frequency) signal may be used. Pairs of samples, separated by a predetermined temporal separation (that is a separation corresponding to a candidate FFT window size) are correlated against one another in functional block 113. Functional element 114 shows determining an average of the correlation values in the correlation blocks.

Each correlation block comprises a predetermined number of correlation values. The number of correlation values in a block or the "block size" is selected based on practical considerations of the apparatus, which may consider memory consumption, resolution in time and resolution in frequency. For example, to obtain better resolution in time, the block size may be set to a fewer number of samples. However, it has been found small block sizes may require longer averaging over a greater number of blocks. Alternatively, to reduce memory usage or processing time, it may be better to provide a block having a greater number of samples therein.

This may be because a large block size provides a correlation peak (if present) with less averaging as the correlation values representative of an actual correlation are accumulated by averaging while correlation values that are high due to noise should reduce by averaging, thereby presenting a correlation peak in the average correlation block with less averaging. Thus, with larger block sizes you may have sufficient SNR in a shorter time, but a coarser resolution in time.

In a DAB based receiver controller the block size may be 16 correlation values per block, although the block size may be between 7 and 25, for example.

Each sample is of a predetermined sample length (e.g. the time based width of 111a), which is a length in terms of time or base band samples. The sampling frequency may be based on the native sampling rate of the standard the receiver controller is attempting to acquire. The sampling frequency may be related to the sampling frequency of the receiver the receiver controller is configured to control. For many digital transmission standards there is a native sampling frequency. For example, a sampling frequency 2.048 MHz in DAB, provides for use of a 2048 Point FFT (i.e. Mode 1) in the receiver.

The temporal length of a correlation block (i.e. number of component sample pairs×sample length) is selected to be substantially equal to one of the possible OFDM symbol lengths of the OFDM standard the receiver controller is configured to receive. For example, in DAB, the OFDM symbols may be 2552, 638, 319 or 1276 samples (with native sampling frequency of 2.048 MHz), which correspond to the four modes of the DAB standard. The receiver controller 200 may control the receiver to look for correlations at each of a predetermined set of correlation block lengths, either in series or in parallel with one another, as described herein below.

The second functional element 113 represents performing a complex conjugate multiplication of the two samples from element 112. In particular, each sample is formed of a sum of complex conjugate multiplied baseband sample pairs. This comprises a process of auto-correlation. The output from the second functional element 113 is a correlation "stream" of successive correlation values between successive pairs of sample blocks.

The third functional bock 114 includes assembling the correlation values into blocks of a predetermined length and calculation of an average correlation block 110 formed of a plurality of average correlation values, the average correlation values comprising averages of corresponding correlation values of a plurality of the correlation blocks (in this example, the first correlation block 107, the second correlation block 108 and the third correlation block 109). The average correlation block 110 is thus a "cyclic" average over a predetermined number of recent correlation blocks. The number of correlation blocks to average may be based on a measure of the signal to noise ratio or a statistical deviation between the individual correlation blocks 107, 108, 109. The samples and/or the correlation values may be subject to IIR or FIR filtering.

The average correlation block 110 provides the receiver controller with the position of the guard interval, comprising the period defined by the correlations values that show a correlation above a threshold. In FIG. 1, three consecutive correlation values 111 are shown as having a higher correlation value that the remaining correlation values. The threshold may be relative to the other average correlation values in the average correlation block or may be an absolute threshold.

The temporal width of the correlation values 111a, 111b, 111c provides the receiver with the OFDM transmission mode in terms of the size of the guard interval. The width may comprise the length of the guard interval plus the length associated with the transmission channel. Once the guard interval length is known, the width of the correlation values is also an indication for the length of the transmission channel. In particular, the presence of one or more correlation values above a threshold indicates that the predetermined temporal separation between the samples used to determine the correlation values is equal or substantially equal to the FFT window size (i.e. the candidate FFT window size is correct). The guard interval length can be determined by checking the periodicity of occurring correlation values or by checking different correlation block sizes (OFDM symbol length=FFT window size+guard interval size=number of correlation values in a correlation block*sample length). If the OFDM symbol length fits with the correlation block length it may be expected to get a correlation value peak with a growing correlation value at a fixed position over the correlation blocks. If the OFDM symbol length does not fit within the correlation block length, the correlation values will be at a different position in e.g. correlation blocks 107, 108, and 109, which results in a clear maximum not being present anymore. Thus, different correlation block lengths may be used to check which average correlation block provides the potential guard length with the highest correlation peak values. This will be an indication of the most likely guard length The average correlation block 110 also provides information about the channel impulse response (CIR) property of the OFDM signal. In particular, the significant parts of the CIR are directly visible in the average correlation block 110. The average correlation block 110 is mathematically the convolution of the CIR with a rectangular window of the cyclic prefix length. This is relevant to calculate the proper timing of the OFDM signal. This is advantageous for time tracking.

The processing of the average correlation block is relatively simple and it may be done in parallel for multiple or all possible OFDM symbol lengths, which can differ due to the different component FFT window length and guard interval length. Thus, the temporal length of each correlation block (i.e. number of sample pairs×sample length) for each parallel process is set to one of the possible (i.e. candidate) OFDM symbol lengths. The separation between the pairs of samples that are correlated may further be set to one of the possible (i.e. candidate) FFT window lengths. Thus, the receiver controller may work through, in series or parallel, combinations of correlation block size and separation between pairs of samples in order to determine one or more of the FFT window size, the OFDM symbol length and the guard interval size.

Thus, the correlation blocks for each candidate mode needs to be analysed to determine whether a correlation is present. Each candidate mode is "checked" by changing the separation between the samples that are correlated against one another. The size of a correlation block may be changed. Once a contiguous group of correlation values of a value greater than the remaining correlation values or greater than a threshold is identified, it can be assumed as indication for an OFDM signal in a certain mode. If the correlation result is flat or noisy, no signal of the particular mode is receivable.

It will be appreciated that the receiver controller may set the temporal length of the sample blocks to the possible OFDM symbol lengths in series rather than parallel to look for a correlations.

Once the decision for a certain mode is made, the timing (i.e. to identify the start of an OFDM symbol in time) may be calculated from the average correlation block 110. This can be done by linear interpolation of the first average correlation value 111*a* in a contiguous group of average correlation values. In particular, the averaged correlation values 111*a*, 111*b*, 111*c* that are identified as being above a threshold will, on average, contain the body of the guard interval. Where the baseband samples used for the correlation values are at the edges of the guard interval, a reduced correlation would be expected and thus the correlation values may be lower. Thus, the average correlation values in the contiguous group that have a substantially common average correlation value (termed "full" correlation values) are assumed to cover only the guard interval while the correlation values immediately adjacent to them are assumed to contain only a part of the guard interval (termed "part" correlation values). The ratio between adjacent full and part correlation values may be indicative of the time during the part correlation value that the guard interval starts or ends. Thus, interpolation from the first full correlation value using the determined ratio may provide the timing of the OFDM symbols. An appreciation of the noise level, estimated from the average correlation values outside the contiguous group 111, may be used to determine where to interpolate to.

Alternatively, to calculate the timing of the OFDM symbols an inter-symbol-interference (ISI) minimized FFT window positioning technique may be used, which can be calculated from the average correlation block result. In certain situations the use of interpolation based on above-threshold and adjacent correlation values may not be optimal. Optimal window position may be found be finding the window (of the guard interval) with the most energy. Alternatively it is possible to calculate an indication of the time tracking if the window should move to the left or right or if it should remain on the current position in the correlation block. The principles of ISI time tracking will be known to those skilled in the art, for example from the ISDB-T standard. However, its application here comprises determination of an energy function and determining if the correlation blocks should be moved temporally forward or backwards. This decision can be taken by calculating the correlation energy left and right of the guard interval. If the energy of both sides stays constant the correlation block may remain on the current position. If one or both sides have correlation energy above a threshold the FFT may be moved into the direction of more energy. This may be implemented as a control loop which uses a left/right signal and/or the correlation values as input. One could also find the optimal correlation block position by calculating the inter-symbol-interference for each possible correlation block. The ISI algorithm generates a signal to noise ratio, which can be estimated by dividing a correlation value sum inside the guard interval by the (weighted) correlation values outside the guard interval (the ISI related noise increases with the distance to the guard interval).

In DAB, for example, the start of a DAB frame is signalled by a special symbol called the null-symbol, during which no energy is transmitted. The presence of the null symbol can be used by the receiver controller 200 to check the determined mode is accurate. In particular, an instantaneous correlation output is checked against the averaged correlation result. Thus, using the determined mode, a further correlation block (such as one after block 109) not forming part of the average correlation block may be checked against the average correlation block 111 or a previous correlation block 107, 108, 109. Each sample should generate a correlation output even if it is noise but the null symbol should not produce a significant correlation output, which can be detected. A Null symbol is indicated by a significant drop in the correlation values, which may be used to determine the timing of the DAB frames and/or trigger the receiver controller 200 to perform further checks on the signal to identify the timing of the DAB frames.

It is also possible to do a continuous calculation of the average correlation block 110 during demodulation to use it for OFDM symbol level time tracking. This is an advantage because it is possible to improve the "resolution" of the time tracking. In DAB, for example, time tracking is normally done on the phase reference symbol, which only appears each 96 ms. For single frequency networks it would be advantageous to perform time tracking more often, which may be possible using the average correlation blocks as described herein. For television standards such as ISDBT or DAB the each OFDM symbol consist of partially known information (pilot carriers), which provides for the performing of time tracking per symbol. However, because there are only a portion of carriers knowledge of the length of the available timing information is limited. The present receiver controller described herein may provide for time tracking for such cases, because the available timing information comprises the length of one OFDM symbol, instead of a porting of the FFT window (e.g. in ISDB-T $\frac{1}{120}$ of the FFT window).

FIG. 2 shows an example functional diagram showing the functional structure of a receiver 201 under the control of the receiver controller 200. The receiver controller 200 may be implemented in hardware, software or firmware. Further, the physical layout of the receiver controller may be different to this functional layout as different or multiple functions may be provided by different components or the same component. For the purposes of this discussion the receiver 201 will be described as performing the various parts of the signal acquisition process, although some or all of the signal acquisition process could be performed by the receiver controller or by the receiver 201 under the control of the receiver controller 200. The receiver 201 and receiver controller 200 are configured to perform the process described above in relation to FIG. 1.

The receiver 201 is shown receiving a baseband OFDM signal 202 comprising a stream of I/Q baseband samples received from a channel, via an antenna or cable for example. The stream of baseband samples are provided to a sample counter 203 which counts the number of baseband samples over time. A sample size determination element 204 is set with a predetermined sample size comprising the desired number of baseband samples in a sample. The sample size determination element 204 uses the output from the counter 203 to determine when the number of baseband samples reaches the desired sample size and provides a control signal 205 to a sample accumulator 206, which sums correlated baseband samples to form correlation values. In addition, the sample counter 203 is reset 207 by the sample size determination element 204 so that it counts the number of baseband samples for the next sample. Thus, the counter 203 and sample size determination element 204 work together to define the size (in terms of the number of baseband samples) of the correlation values.

A signal 208 of the sample size determination element 204, indicative of the end of a sample or start of the next sample is provided as a gate signal 210 to a sample selector 211 and also to a sample counter 212, which counts the number of samples received.

The I/Q baseband samples 202 are also provided to a delay element 213 and as one of two input signals 214 to a complex conjugate multiplication element 215. A second input signal 216 to the complex conjugate multiplication element 215 is provided by the delay 213. Thus the second input signal comprises the same I/Q baseband samples but delayed by a predetermined number of baseband samples set by the delay 213.

The delay 213 is configured to delay the signals by a candidate FFT window size or, in particular, a number of baseband samples substantially equivalent to the FFT window size. The number of baseband samples may not exactly equal the candidate FFT window size, but may be sufficiently close (i.e. with a predetermined tolerance) for a correlation to be detected.

Where $i_n$ represents an I/Q baseband sample, the complex conjugate multiplication element 215 performs complex conjugate multiplication on sample $i_n$ and sample $i_{n+delay}$ where "delay" is equal to the separation between the baseband samples provided by the delay.

The output of the element 215 comprises a correlation value between the sample $i_n$ and sample $i_{n+delay}$. The correlated baseband signal pairs are assembled into correlation values 115 by the sample accumulator 205. On receipt of the signal 205, the sample accumulator 205 provides as output the stored correlation value at output 217. The sample accumulator then clears its memory to accumulate the next correlation value.

An averaging element 218 for averaging of correlation values (and possibly performing IIR or FIR filtering) is configured to receive the correlation values 115 from the sample accumulator 205 along with a previously determined average/correlation value 220 from a memory 221.

In this example, four memory locations (for diagrammatic simplicity) are provided for storing four correlation values.

The output 222 from the averaging element 218 comprising an average correlation value of its two correlation value inputs 217, 220, which is provided to the selector 211 for storing at an appropriate location in the memory 221. The selector 211 uses the baseband sample counter gate signal 210 and the sample counter to decide in what location to store the average correlation value output at 222.

A further selector 223, based on the output of the sample counter 212 retrieves the previously determined (average) correlation value 220 from the memory 221 and provides it to the averaging element 218. Thus, the memory 221 may provide for storing and retrieval of correlation values and/or averages of correlation values in order to derive the average correlation block from the contents of the memory 221.

Accordingly, the receiver 201 provides, from memory 221, an average correlation block for deriving the OFDM mode and timing, as described in relation to FIG. 1.

If no correlation is identified, the receiver controller 200 may select a different candidate FFT window length and set the delay 213 and the sample counter 212 with appropriate values. The process may then repeat to see if the average correlation block 111 reveals the correlation relating to the cyclic prefix for use in mode acquisition.

Figure 3:
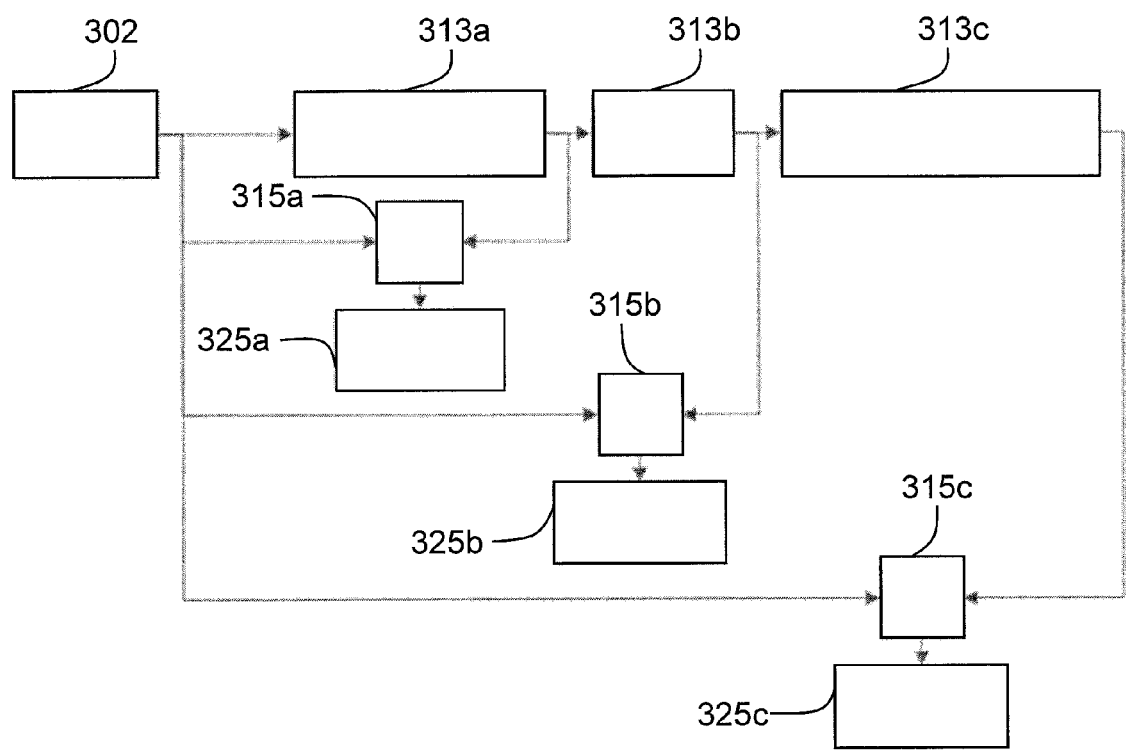
FIG. 3 shows an example functional diagram showing the generation of the sample blocks.

FIG. 3 shows an example functional diagram showing the generation of complex conjugate multiplication values of baseband samples to form the correlation values in parallel for forming correlation blocks having different candidate FFT window sizes (which is determined by the separation of the baseband samples that are correlated together). Thus, the stream of I/Q baseband samples representing the OFDM signal is received at 302 and is provided as one of the inputs to each of a plurality of complex conjugate multiplication elements. In this example, three complex conjugate multiplication elements are provided: a first complex conjugate multiplication element 315a, a second complex conjugate multiplication element 315b and a third complex conjugate multiplication element 315c. The I/Q baseband samples are also provided to a chain of delay elements 313a, 313b, 313c. The first delay element 313a provides a first delayed baseband sample to the first complex conjugate multiplication element 315a delayed by "A" baseband samples. The first delay element 313a in combination with the second delay element 313b provides a second delayed sample to the second complex conjugate multiplication element 315b delayed by "B" baseband samples. The first delay element 313a in combination with the second delay element 313b and the third delay element 313c provides a third delayed sample to the third complex conjugate multiplication element 315c delayed by "C" baseband samples. The values of A, B and C baseband samples may correspond to the candidate FFT window lengths (i.e. predetermined separation number of baseband samples). Thus, the delay elements 313a, 313b, 313c accumulate a delay in the I/Q baseband samples to achieve the candidate predetermined separation number of samples.

It will be appreciated that as many delays and complex conjugate multiplication elements may be provided as there are candidate FFT window sizes. Alternatively, the candidate FFT window sizes may be worked through in series or in parallel in batches. It will be appreciated that each different OFDM symbol length for a particular FFT size requires an extra block calculation as shown in FIG. 2 which may use different numbers of correlation values in the correlation blocks.

The output from each complex conjugate multiplication element 313a-c is provided to a cyclic sample average element 325a, b, c, which is representative of the process performed in box 225 of FIG. 2.

In use, the delay 213 or delays 313a, b, c are set to a candidate FFT window size. Thus, a first baseband sample of the cyclic prefix/postfix will be correlated with a baseband sample at a position in the FFT window at "FFT window-guard interval" separation. Accordingly, if the delays represent the FFT window size correctly, a correlation should occur. The number of above-threshold average correlation values for such a correlation is indicative of the size of the guard interval (directly or indirectly). Thus, the mode of the OFDM signal can be determined.

While the length of the guard interval may be determined based on the size of the above-threshold average correlation values ("the correlation"), practically such a direct comparison may not be sufficiently accurate as the correlation may be representative of the sum of the guard interval length and a channel length. Use of the periodicity of the correlation may improve accuracy. A linear interpolation based on a ratio between one of the correlation values that exceeds the predetermined threshold and an adjacent correlation value that does not exceed the threshold and interpolated from a point in time associated with said correlation values that exceeds the predetermined threshold may provide an accurate determination of where during the correlation values the guard interval starts or end. Thus, it will be appreciated that the start of the guard interval may not be exactly aligned (in terms of the baseband samples for example) with the samples used to form the correlation values. As the number of correlated pairs of baseband samples present in a sample increases, the greater the correlation value may be. Thus, once a contiguous group of one or more correlation values above a threshold are identified, which is believed to show the cyclic prefix/postfix, the ratio between correlation values at the edge of the group with an adjacent correlation values outside the group, may assist in determining at what baseband sample within the samples the cyclic prefix/postfix starts. Accordingly, the length of the guard interval may be determined from the number of correlation values above the threshold or by employing the interpolation technique described above. Other possible algorithms for determining at which baseband sample that forms the associated correlation values the guard interval starts or ends may include an inter-symbol-interference minimized FFT window positioning algorithm; a simple maximum usage algorithm; a centre of gravity calculation; among others. Once the time of the start and end of the guard interval is determined, the size of the guard interval is the difference there between. Such techniques also enable the timing of the symbols in the signal to be determined.

To detect the different symbol lengths (FFT window size+guard interval length) the cycle of the averaging element 218 needs to be according to the symbol length i.e. the size of the average correlation block should be equal or substantially equal to the symbol length. If it is not, then the position of the above-threshold correlation values in the average correlation function will move over time. However, the symbol length and/or the guard interval length may be determined by checking the periodicity of any occurring average correlation values.

Thus, the receiver controller may be configured to provide for correlation and for assembly of correlation blocks for different predetermined separation number of samples and different predetermined correlation block sizes until an above-threshold correlation value or values is found in the average correlation block.

The correlation blocks may overlap in terms of the samples or baseband samples used to form them. This may provide reliable scanning of the OFDM signal or may be for implementation reasons when selecting the predetermined separation number of samples and correlation block size i.e. the symbol length may not factorise conveniently to obtain a desirable correlation block size.

There is also a trade-off between time resolution, correlation result quality and correlation result settling. To improve the time resolution the correlation value size may be reduced, which means there are more correlation values in the memory for forming the average correlation block.

For a receiver having multiple antennas the process of FIGS. 2 and 3 may be partially executed per antenna and the results combined. The combining may be performed in a weighted manner in terms of the measured reception quality or signal strength of the antennas. The combining of the samples or results may be possible:

i) after the conjugate complex multiplication by elements 215, 315 where the combination is a weighted average of the two values;
ii) after the complex correlation result i.e. following complex conjugate multiplication 215 and before storing in the memory 221;
iii) after the determination of the average correlation block 110 from the values stored in the memory 221;
iv) at the receipt of the I/Q samples at 202, 302 (this can be done with and without phase correction between the antennas).

The receiver controller may be configured to not only determine signal parameters during initial signal acquisition, but may continue to determine the average correlation blocks to track the length and/or time of the signals during receipt of a service contained with the symbols of signal. Thus, the controller may be configured to determine the average correlation block either continuously or intermittently during receipt of a service encoded into the signal by the receiver.

As the correlation values are complex values and the receiver controller may be configured to determine a fine frequency offset parameter of the signal from an angle component of the complex values present in the average correlation block. A frequency offset, which can be caused by different reference clocks or other impairments (e.g. Doppler shift due to velocity of the receiver e.g. a car, train or plain), may cause a linear phase rotation in the time domain. This leads to a constant phase difference between base band pairs used for the complex conjugate multiplication. Depending on the frequency offset, the phase rotation in the delay interval may be an integer multiple round, which would not be seen in the average correlation block. However a fractional part of the phase rotation results in an angle of the correlation value. The so called fine frequency error can be calculated by angle(corr)*samplingFrequency/(2*pi*delayLength) where angle(corr) comprises the phase difference when a correlation is found, sampling frequency comprises the frequency used to sample the baseband samples and delayLength comprises the delay between corresponding samples.

The decision on where the results are combined may be system dependent. For examples, if the different antennas have a different frequency offset because of different reference crystals in a distributed system, it may be advantageous to combine the absolute correlation results to overcome the different phases of the different offsets.

Using this technique of OFDM signal acquisition has been found to improve the scanning time. There is a DAB standard test called "Band scan VHF". Using the signal acquisition technique described herein the scanning time improved from 4.2 to 2.3 seconds. The scanning may be faster and more reliable.

Figure 4:
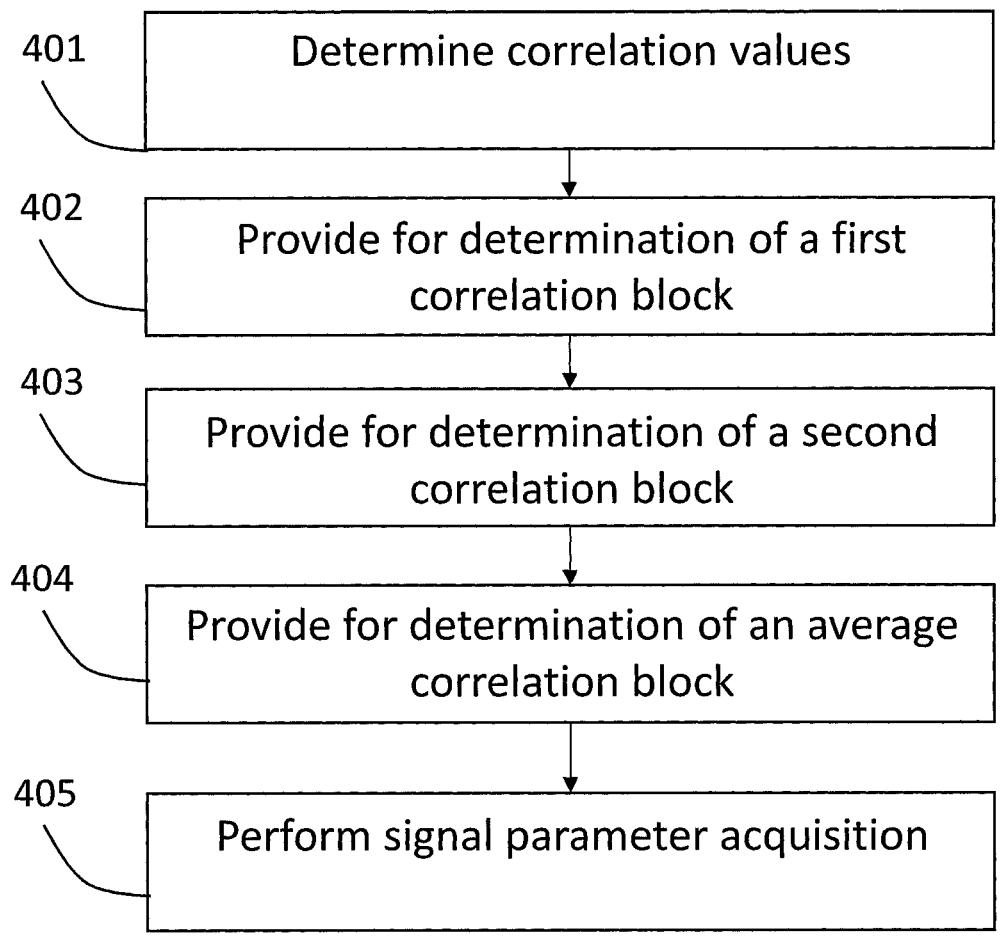
FIG. 4 shows a flowchart illustrating an example method performed by the receiver controller.

FIG. 4 shows a flowchart illustrating a method performed by a receiver controller or receiver. The method comprises based on a plurality of samples of the received signal, each sample having a predetermined sample length, provide for determination 401 of a plurality of correlation values based on pairs of the plurality of samples, said pairs of samples separated in time by a predetermined separation number of samples. Provide 402 for determination of a first correlation block comprising a plurality of consecutive correlation values, the number of correlation values within the first correlation block based on a predetermined correlation block size. Provide 403 for determination of a second correlation block comprising a plurality of consecutive correlation values, the number of correlation values within the second correlation block based on the predetermined correlation block size, wherein the temporal separation between the first and the second correlation blocks is based on the predetermined correlation block size. Provide 404 for determination, using an average of at least the first correlation block and the second correlation block, an average correlation block. Perform signal parameter acquisition 405 if one or more average correlation values above a predetermined threshold are present in the average correlation block, by acquiring the at least one signal parameter of the signal, from the average correlation block, comprising the length of the guard interval and/or the length of the FFT window and/or the timing of the symbols that form the signal.

Figure 5:
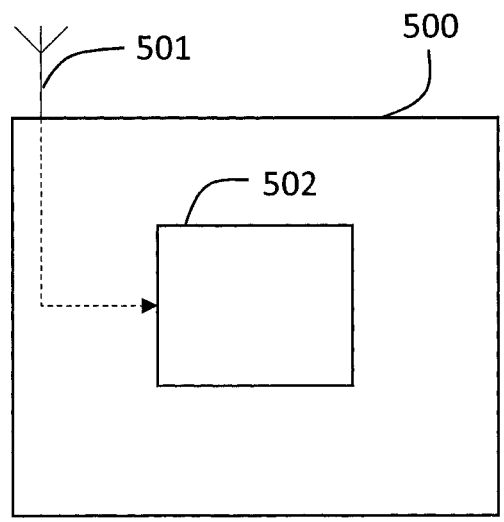
FIG. 5 shows a receiver including the receiver controller as well as an electronic device including the receiver.

FIG. 5 shows an electronic device 500, such as a DAB radio or DVB TV, including a receiver 502 and an antenna 501 for receiving an OFDM input signal for providing to the receiver 502. The receiver is controlled, at least in part, by the receiver controller described above.

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A receiver controller configured to control a receiver in receipt a signal comprising a series of time-consecutive symbols, each symbol comprising a service data window and a guard interval, said guard interval comprising a cyclic prefix or postfix, the receiver controller configured to control the receiver to acquire at least one signal parameter, the receiver controller configured to;

based on a plurality of samples of the received signal, each sample having a predetermined sample length, provide for determination of a plurality of correlation values based on pairs of the plurality of samples, said pair of samples separated in time by a predetermined separation number of samples;

provide for determination of a first correlation block comprising a plurality of consecutive correlation values, the number of correlation values within the first correlation block based on a predetermined correlation block size, provide for determination of a second correlation block comprising a plurality of consecutive correlation values, the number of correlation values within the second correlation block based on the predetermined correlation block size, wherein the temporal separation between the first and the second correlation blocks is based on the predetermined correlation block size, provide for determination, using an average of at least the first correlation block and the second correlation block, an average correlation block, wherein the average correlation block comprise a set of consecutive averaged correlation values, wherein an average correlation block comprises a set of consecutive averaged correlation values, wherein an average correlation value is an average of a first correlation value from the first correlation block and a first correlation value from the second correlation block, wherein the first correlation value from the first correlation block and the second correlation value from the second correlation block are both in the same time slot of their respective correlation blocks; and if one or more average correlation values above a predetermined threshold are present in the average correlation block, acquire the at least one signal parameter of the signal, from the average correlation block, comprising the length of the guard interval and/or the length of the service data window and/or the timing of the symbols that form the signal.

2. The receiver controller according to claim 1, in which the receiver controller is configured to provide for determination of timing of the symbols that form the signal by at least one of;

a linear interpolation based on a ratio between one of the correlation values that exceeds the predetermined threshold and an adjacent correlation value that does not exceed the threshold and interpolated from a point in time associated with said correlation values that exceeds the predetermined threshold;

an inter-symbol-interference minimized service data window positioning algorithm;

a maximum usage algorithm;

a centre of gravity calculation;

based on the temporal position of the one or more average correlation values above the predetermined threshold.

3. The receiver controller according to claim 1, in which the receiver controller is configured to determine an average correlation block for a plurality of candidate combinations of;
   the predetermined separation number of samples; and
   the predetermined correlation block size;
to identify the average correlation block that includes one or more average correlation values above a predetermined threshold present in order to acquire the signal parameters of the signal therefrom.

4. The receiver controller according to claim 1, in which the samples are each based on a predetermined number of measurements of baseband samples of the signal, which defines the predetermined sample length, the measurements of the baseband samples comprising in-phase (I) and quadrature (Q) elements, and the correlation value between pairs of samples comprises a sum of complex conjugate multiplied pairs of the baseband samples, the pairs separated by a predetermined number of baseband samples corresponding to the predetermined separation number of samples.

5. The receiver controller according to claim 4, in which the predetermined correlation block size is selected based on the product of the sample length and the number of correlation values within one of the correlation blocks being equal or substantially equal to a candidate symbol length of the signal in terms of the number of baseband samples that form said symbol length.

6. The receiver controller according to claim 1, in which the predetermined separation number of samples is based on a candidate service data window size.

7. The receiver controller according to claim 1, in which if the signal includes a null-signal comprising a period of time in which no energy is transmitted and which is indicative of the start of a logical group of symbols, the receive controller is configured to;
   once an average correlation block is identified that includes correlation value(s) above the predetermined threshold, identify a null correlation block amongst a plurality of correlation blocks by identifying the correlation blocks with correlation values below a null threshold, the plurality of correlation blocks determined using the same predetermined separation number of samples and the predetermined correlation block size used to identify the aforesaid average correlation block that includes correlation value(s) above the predetermined threshold.

8. The receiver controller according to claim 1, in which the receiver controller is configured to acquire the signal parameters by way of one or more of the following;
   determine the length of the guard interval from the number of consecutive correlation values above the predetermined threshold present in the average correlation block;
   determine the service data window size from the predetermined separation number of samples used when the one or more correlation values above the predetermined threshold are present in the average correlation block;
   determine the timing of the start of a symbol based on the temporal position of the one or more correlation values above the predetermined threshold that are present in the average correlation block.

9. The receiver controller according to claim 1, in which the receiver controller is configured to, following determination of the signal parameters, determine further average correlation blocks using the predetermined separation number of samples and said correlation block size corresponding to the determined signal parameters, to track the service data window position either continuously or intermittently during receipt of a service encoded into the signal by the receiver.

10. The receiver controller according to claim 1, in which the correlation values are complex values and the receiver controller is configured to determine a fine frequency offset parameter of the signal from an angle component of the complex values present in the average correlation block.

11. The receiver controller according to claim 1, in which the receiver controller is configured to provide for processing of a first signal from a first antenna and a second signal from a different second antenna, and provide for combination of the signals or data derived from the signals, wherein the combination is based on at least one of;
   samples of the first signal and the second signal combined prior to determination of the correlation values;
   samples of the first signal used to determine a first set of correlation values and samples of the second signal used to determine a second set of correlation values, the first and second sets of correlation values combined prior to determination of the average correlation block;
   samples of the first signal used to determine a first average correlation block and samples of the second signal used to determine a second average correlation block, the first and second average correlation blocks combined prior to determination of the signal parameters from a resultant combined average correlation block.

12. The receiver controller according to claim 11, in which the combination is weighted based on a measure of a relative signal quality associated with the signal from each antenna and/or the signals from the first and second antenna are phase corrected.

13. A receiver including an antenna for receiving a signal comprising a series of time-consecutive symbols, each symbol comprising a service data window and a guard interval, said guard interval comprising a cyclic prefix or postfix, the receiver including the receiver controller of claim 1, to acquire the signal parameters for receipt of a service contained in the signal.

14. A method of acquiring at least one signal parameter from a signal comprising a series of time-consecutive symbols, each symbol comprising a service data window and a guard interval, said guard interval comprising a cyclic prefix or postfix, the method comprising;
   based on a plurality of samples of the received signal, each sample having a predetermined sample length, provide for determination of a plurality of correlation values based on pairs of the plurality of samples, said pairs of samples separated in time by a predetermined separation number of samples;
   providing for determination of a first correlation block comprising a plurality of consecutive correlation values, the number of correlation values within the first correlation block based on a predetermined correlation block size,
   providing for determination of a second correlation block comprising a plurality of consecutive correlation values, the number of correlation values within the second correlation block based on the predetermined correlation block size,
   wherein the temporal separation between the first and the second correlation blocks is based on the predetermined correlation block size,
   providing for determination, using an average of at least the first correlation block and the second correlation block, an average correlation block, wherein the average correlation block comprises a set of consecutive averaged correlation values, wherein an average correlation value is an average of a first correlation value from the first correlation block and a first correlation value from the second correlation block, wherein the first correlation value from the first correlation block and the second correlation value from the second correlation block are both in the same time slot of their respective correlation blocks; and if one or more average correlation values above a predetermined threshold are present in the average correlation block, acquiring the at least one signal parameter of the signal, from the average correlation block, comprising the length of the guard interval and/or the length of the service data window and/or the timing of the symbols that form the signal.

15. An electronic device including the receiver of claim 13.

* * * * *